United States Patent [19]

Tsutsui

[11] Patent Number: 4,684,987
[45] Date of Patent: Aug. 4, 1987

[54] CRT DISPLAY UNIT
[75] Inventor: Akio Tsutsui, Imaichi, Japan
[73] Assignee: Sharp Kabushiki Kaisha, Osaka, Japan
[21] Appl. No.: 766,334
[22] Filed: Aug. 16, 1985
[30] Foreign Application Priority Data Aug. 31, 1984 [JP] Japan ............... 59-133023[U]
Oct. 23, 1984 [JP] Japan ............... 59-223477
Oct. 24, 1984 [JP] Japan ............... 59-224853
Dec. 25, 1984 [JP] Japan ............... 59-200021

[51] Int. Cl.$^4$ .............................. H04N 5/04
[52] U.S. Cl. .................. 358/148; 358/150; 358/158
[58] Field of Search ............... 358/140, 148, 149, 150, 358/158, 903; 340/814

[56] References Cited
U.S. PATENT DOCUMENTS

| 4,246,609 | 1/1981 | Van Der Valk | 358/150 |
| 4,316,219 | 2/1982 | Smith et al. | 358/150 |
| 4,414,571 | 11/1983 | Kurcha et al. | 358/158 |
| 4,616,260 | 10/1986 | Erwin et al. | 358/150 |

Primary Examiner—James J. Groody
Assistant Examiner—Michael D. Parker
Attorney, Agent, or Firm—Birch, Stewart, Kolasch & Birch

[57] ABSTRACT

A CRT display unit comprises a line mode detecting circuit (17) for determining a standard mode or a high-resolution mode dependent on the output of a counter (179) counting a horizontal synchronizing signal. When the high-resolution mode is determined, a switching circuit (18) enables a horizontal oscillator (13) and a horizontal deflecting circuit (14) to operate corresponding to the high-resolution mode. In other words, the switching circuit (18) selects time constants (R2 and C1) so as to increase a horizontal oscillating frequency of the horizontal oscillator (13). To a collector of a horizontal deflecting transistor (Q3), two capacitors (C3 and C4) are connected so that a horizontal flyback period may be shortened. An end of a horizontal deflecting coil (28) is connected to a step-down transformer (27) so as to increase a horizontal amplitude. Thus, the horizontal oscillating frequency, the horizontal amplitude and the horizontal flyback period can be automatically set according to each mode.

9 Claims, 8 Drawing Figures

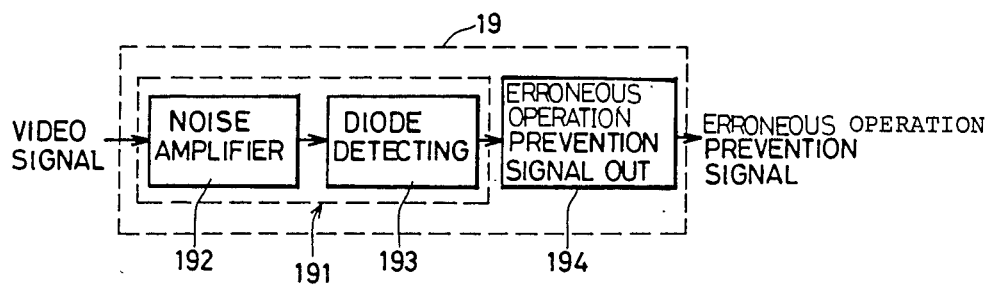
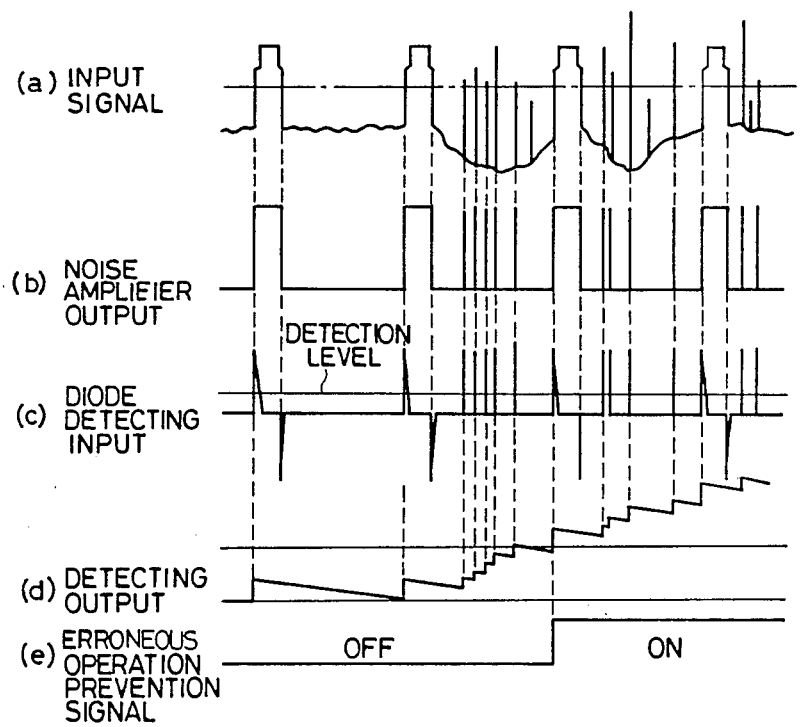

CRT DISPLAY UNIT

BACKGROUND OF THE INVENTION

1. Field of the Invention

The present invention relates to a CRT display unit. More particularly, the present invention relates to a CRT display unit which can be used in two modes, that is, a standard mode having 262.5 scanning lines for one field and a horizontal deflecting frequency of 15.754 kHz and a high-resolution mode having scanning lines twice as many as those of the standard mode and a horizontal deflecting frequency of approximately 25 kHz, this CRT display unit being utilizable as a display unit for a personal computer, a home video game set and the like.

2. Description of the Prior Art

Recently, in order to display a clear picture in an electronic calculator such as a personal computer, improvements have been made to enhance the performance of the graphic function. In fact, there are personal computers which provide an output having a resolution of 320×200 dots, 640×200 dots or 640×400 dots. As a CRT display unit corresponding to such graphic display, a television set for domestic use can be used in the case of 320×200 dots or 640×200 dots since the scanning lines in such cases are less than 230 scanning lines generally included in an ordinary television set put on the market.

On the other hand, in a CRT display unit for display at a high resolution with 640×400 dots, the number of scanning lines is increased and consequently, it is necessary in principle to lower the vertical deflecting frequency in this case. However, practically, the vertical deflecting frequency cannot be much lowered because of the necessity of preventing flicker in the Braun tube. For example, in the case of 200 lines and 60 Hz, the vertical deflecting frequency can only be decreased to approximately 50 to 55 Hz. In consequence, it is necessary to increase the horizontal deflecting frequency, for example, to 24.85 kHz with respect to 15.75 kHz with 200 lines. Such vertical and horizontal deflecting frequencies are greatly different from those of an ordinary television set and therefore, a high-resolution CRT display unit to be used exclusively for display is required. Display units of 400 lines meeting such requirement, especially those for personal use are in little demand and the manufacturing cost thereof tends to be high.

SUMMARY OF THE INVENTION

Therefore, a principal object of the present invention is to provide a CRT display unit capable of automatically detecting a standard mode or a high-resolution mode to select the appropriate number of scanning lines according to the detected mode.

Briefly stated, the present invention is adapted to select a horizontal oscillating frequency, a horizontal amplitude and a horizontal flyback period according to the determined mode, that is, either the standard mode or the high-resolution mode determined dependent on the output of the counting means which counts a horizontal synchronizing signal and is reset by a vertical synchronizing signal.

Thus, the present invention makes it possible to automatically determine the respective modes and to select a horizontal oscillating frequency, a horizontal amplitude and a horizontal flyback period according to the determined mode even if there is a considerable difference in the horizontal deflecting frequencies in the respective modes, which are for example, approximately 16 kHz (preferably 15.75 kHz) and approximately 25 kHz (preferably 24.85 kHz).

In a preferred embodiment of the present invention, in response to determination by the determining means of the change to the high-resolution mode, a time constant of the horizontal oscillating means included in the horizontal deflecting means is selected appropriately. According to the high-resolution mode, switching is made to operate a time constant circuit for determining a flyback period, connected on the output side of a horizontal deflecting transistor driven by the horizontal drive means receiving the oscillation output of the horizontal oscillating means. As a result, the flyback period can be shortened. Further, one end of a horizontal deflecting coil connected to the collector of the horizontal deflecting transistor through an S-letter correction capacitor is connected to a step-down transformer so that a horizontal amplitude according to the high-resolution mode is provided.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a concrete block diagram of an erroneous operation prevention circuit shown in FIG. 1.

FIG. 6 is a timing chart for explaining the operation of the erroneous operation prevention circuit.

DESCRIPTION OF THE PREFERRED EMBODIMENT

Figure 1:
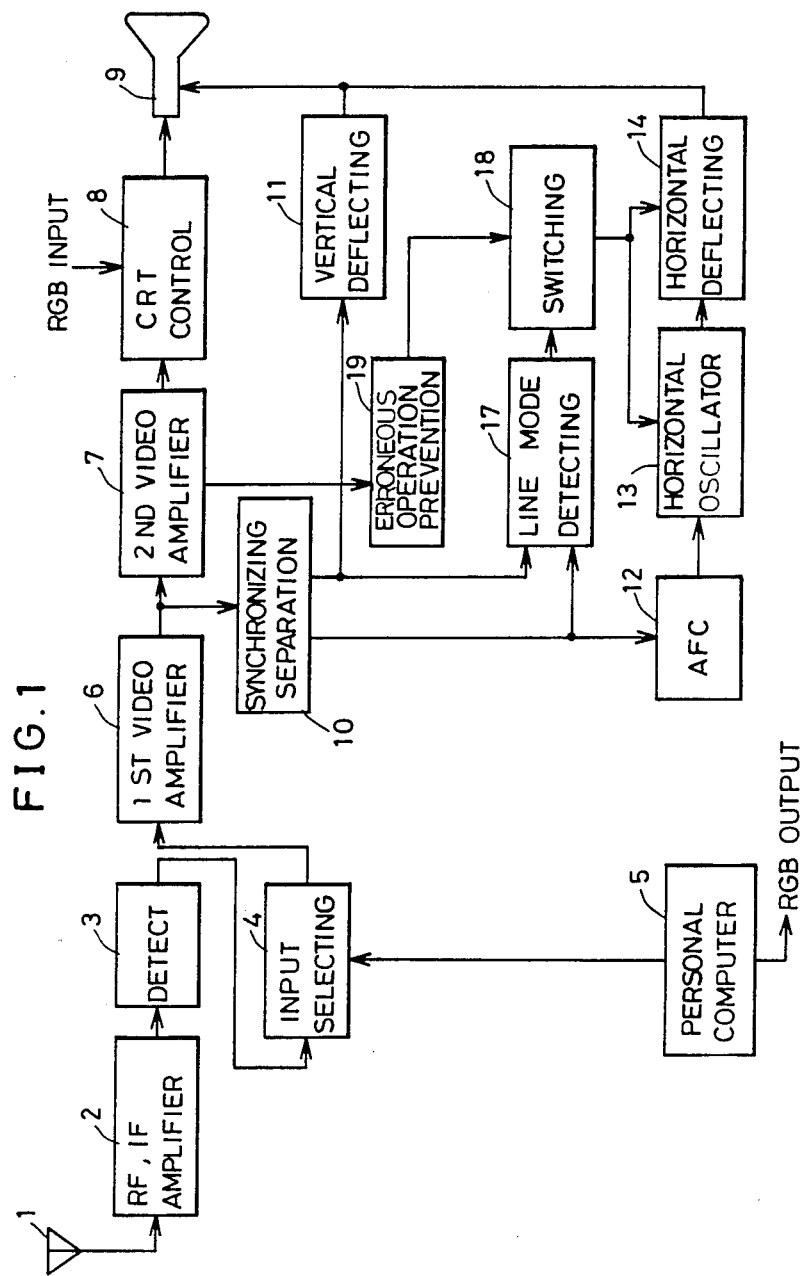
FIG. 1 is a schematic block diagram showing the total construction of an embodiment of the present invention.

FIG. 1 is a schematic block diagram showing the total construction of a television set where an embodiment of the present invention is applied. First, referring to FIG. 1, the construction of the television set will be described. An antenna 1 receives a radio wave from a broadcasting station and applies a television signal to an RF and IF amplifier 2. The television signal applied to the RF and IF amplifier 2 is provided to a detecting circuit 3. The output of the detecting circuit 3 is applied to an input selecting circuit 4. The input selecting circuit 4 makes selection between a television signal applied from an external apparatus such as a personal computer 5 and a television signal based on the radio wave applied through the antenna 1. A personal computer signal provided from the personal computer 5, as shown in the following table 1, has a line mode B or C with respect to the television signal A based on the radio wave.

TABLE 1

| Number of Lines for One Frame | | Vertical (Hz) | Horizontal (Hz) |
|---|---|---|---|
| Television Signal A | 262.5 | 59.9 | 15734 |
| Personal Comp. Signal B | 258.0 | 61.9 | 15980 |
| Personal Comp. Signal C | 448.0 | 55.4 | 24830 |

The television signal selected by the above stated input selecting circuit 4 is applied to the subsequent first video amplifier 6. The first video amplifier 6 amplifies the television signal to provide the video signal to a second video amplifier 7 and a synchronizing signal separation circuit 10. The second video amplifier 7 amplifies the video signal and applies the amplified signal to a CRT control circuit 8. The CRT control circuit 8 converts the video signal provided from the second video amplifier 7 from the serial signal to a parallel signal so as to enable the respective cathodes G, R and B of the CRT 9. The CRT control circuit 8 is adapted to enable the respective cathodes of the CRT 9 also by the respective signals RGB applied from the above stated personal computer 5.

The synchronizing signal separation circuit 10 separates a vertical synchronizing signal $F_V$ and a horizontal synchronizing signal $F_H$ from the video signal. The vertical synchronizing signal $F_V$ is applied to a vertical deflecting circuit 11. The vertical deflecting circuit 11 drives the vertical deflecting coil of the CRT 9. On the other hand, the horizontal synchronizing signal $F_H$ is applied to a horizontal oscillating circuit 13 through an AFC 12. The horizontal oscillating circuit 13 provides a horizontal deflection control signal having a different oscillating frequency corresponding to the selected line mode in synchronism with the horizontal synchronizing signal $F_H$. The horizonal deflection control signal provided from the horizontal oscillating circuit 13 is applied to the horizontal deflecting circuit 14. The horizontal deflecting circuit 14 enables the horizontal deflecting coil of the CRT 9 based on the horizontal deflection control signal.

Further, the television set comprises a line mode detecting circuit 17, a switching circuit 18 and an erroneous operation prevention circuit 19, which characterize the present invention. To the line mode detecting circuit 17, the horizontal synchronizing signal $F_H$ and the vertical synchronizing signal $F_V$ are applied. The line mode detecting circuit 17 detects the respective modes. The switching circuit 18 selects a horizontal oscillating frequency for the horizontal oscillating circuit 13 according to the detected mode and also selects a horizontal flyback period and a horizontal amplitude for the horizontal deflecting circuit 14 according to the detected mode. The erroneous operation prevention circuit 19 prevents the switching circuit 18 from erroneously operating due to a noise contained in the video signal.

Figure 2:
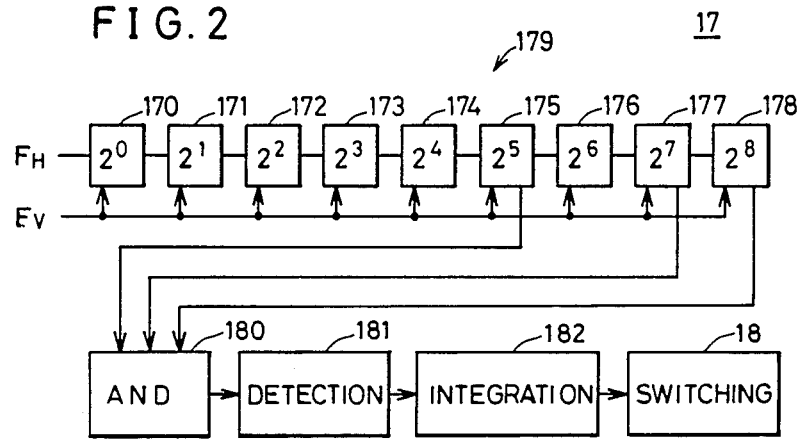
FIG. 2 is a concrete block diagram of a line mode detecting circuit shown in FIG. 1.
Figure 3:
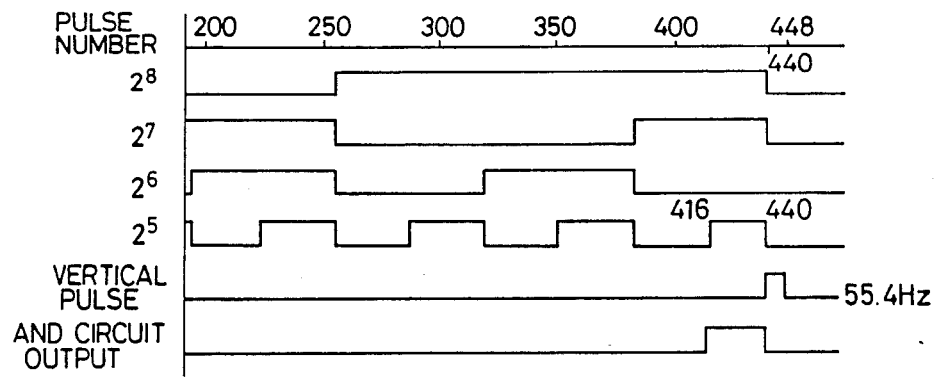
FIGS. 3 and 4 are timing charts for explaining the operation of the line mode detecting circuit.
Figure 4:
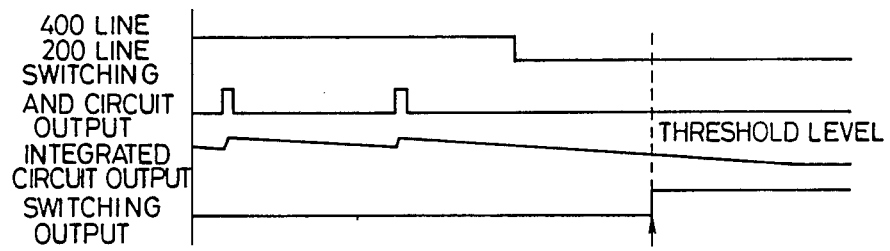

FIG. 2 is a specific block diagram of the line mode detecting circuit shown in FIG. 1 and FIGS. 3 and 4 are timing charts for explaining the operation of the line mode detecting circuit.

The line mode detecting circuit 17 comprises a counter 179, an AND circuit 180, a detector 181 and an integrator 182, as shown in FIG. 2. The counter 179 counts the number of pulses of the horizontal synchronizing signal $F_H$ provided from the above stated synchronizing separation circuit 10 and is set by the vertical synchronizing signal $F_V$. This counter 179 comprises nine stages of binary counters 170 to 178. The AND circuit 180 has three input terminals to which are connected, respectively, the count output $2^5$ of the counter 175 in the sixth stage, the count output $2^7$ of the counter 177 in the eighth stage and the count output $2^8$ of the counter 178 in the ninth stage, these three counters being included in the counter 179.

To the output terminal of the AND circuit 180, the integrator 182 is connected through the detector 181. The integrator 182 is characterized by a short charging time and a long discharging time. The charging time is equal to an output period of the AND circuit 180, that is, a pulse period of the vertical synchronizing signal $F_V$ and a discharging time constant T is set to more than a half cycle $T_V/2$ of the vertical synchronizing signal $F_V$ so as to prevent erroneous operation due to lowering of the output of the AND circuit 3. The output of the integrator 182 is applied to the above stated switching circuit 18.

The switching circuit 18 comprises a semiconductor circuit, for example, a CMOS logic circuit with a threshold level set to approximately ½ of the supplied voltage, so that the output thereof falls to a low level in the case of the input thereof higher than a predetermined threshold level and rises to a high level in the case of the input thereof lower than the threshold level.

The operation of the line mode detecting circuit 17 thus constructed will be described in the following. When a personal computer signal C having 448 lines for one frame as shown in Table 1 for example is applied from the personal computer 5, the counter 179 counts each time a horizontal synchronizing signal $F_H$ is applied to the counter 179. The counter 178 in the last stage, namely, in the ninth stage provides an output which attains the high level only after the receipt of the 256th horizontal synchronizing signal $F_H$. Then, the counter 178 is reset by the vertical synchronizing signal $F_V$ applied simultaneously with the 440th horizontal synchronizing signal $F_H$, so that the output thereof returns to the low level. It is in a period after the receipt of the 416th horizontal synchronizing signal $F_H$ and before the receipt of the vertical synchronizing signal $F_V$ that the output of the counter 177 in the eighth stage and the output of the counter 175 in the sixth stage both attain the high level with the output of the counter 178 in the ninth stage being at the high level.

Thus, in a period when the outputs of the counters 175, 177 and 178 in the sixth, eighth and ninth stages respectively are all at the high level, the output of the AND circuit 180 attains the high level so that the integrator 182 is charged. When the counter 179 restarts counting after passage of that period, the output of the AND circuit 180 falls to the low level and all the outputs of the counters 175, 177 and 178 in the sixth, eighth and ninth stages respectively attain again the high level, so that the integrator 182 is discharged till the output of the AND circuit 180 rises to the high level. Since the discharging time constant of the integrator 182 is set to more than ½ of the vertical synchronizing cycle $T_V$, charging operation is repeated in a period after the start of discharging of the integrator 182 before the lowering of the output level to ½ of the supplied voltage and consequently, the output of the integrator 182 is provided as a mode signal $V_M$ of a high level maintained higher than the threshold level of the switching circuit 18. Now, let us assume that the input selecting circuit 4 selects a television signal based on a radio wave instead of the above stated personal computer signal from the personal computer 5. In this case, the output of the counter 178 in the ninth stage is at the low level till the 255th horizontal synchronizing signal $F_H$ is received. After the receipt of the 256th horizontal synchronizing signal $F_H$, the output of the counter 178 is at the high level till the vertical synchronizing signal $F_V$ is received simultaneously with the 258th horizontal synchronizing signal. On the contrary, the outputs of the counters 177 and 175 in the eighth and sixth stages respectively are changed to the low level in the period after the receipt of the 256th horizontal synchronizing signal till the receipt of the vertical synchronizing signal $F_V$. As a result, no output is provided from the AND circuit 180 and the integrator 188 continues to be discharged, the output thereof not being returned to the supplied voltage. Thus, the output level is provided as the mode signal $V_M$ of a low level lower than the threshold level of the switching-circuit 18.

When the mode signal of the integrator 182 is at the high level, the output of the switching circuit 18 is of a low value, so that the horizontal oscillating frequency and the oscillating frequency of the horizontal oscillating circuit 13 associated with the operation of the deflecting circuit are changed to correspond to the personal computer signal C shown in Table 1. Also in the horizontal deflecting circuit 14, the horizontal amplitude and the horizontal flyback period are changed. This changing operation will be described later in detail with reference to FIG. 8.

FIG. 5 is a specific block diagram of the erroneous operation prevention circuit shown in FIG. 1; FIG. 6 is a timing chart for explaining the operation of the erroneous operation prevention circuit; and FIG. 7 is a detailed electric circuit diagram of the erroneous operation prevention circuit.

Figure 7:
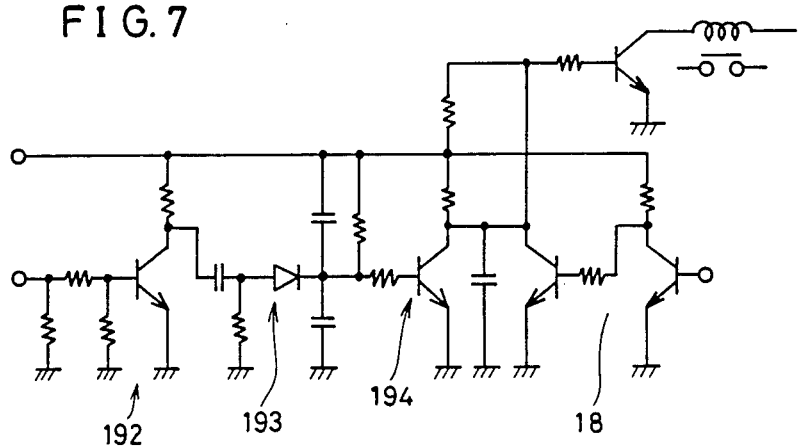
FIG. 7 is a detailed electric circuit diagram of the erroneous operation prevention circuit.

Referring to FIGS. 5 to 7, the erroneous operation prevention circuit will be described. If a video signal containing a noise is provided from the first video amplifier 6, a pulse due to the noise could be mixed in the horizontal synchronizing signal $F_H$ provided from the synchronizing separation circuit 10, resulting in erroneous operation of the line mode detecting circuit 17 which counts the number of pulses of the horizontal synchronizing signal $F_H$. More specifically, if a pulse due to the noise is mixed in the horizontal synchronizing signal $F_H$, the apparent number of pulses of the horizontal synchronizing signal becomes considerably larger than the real number of pulses of the horizontal synchronizing signal and the counter 179 might count the number of pulses corresponding to a different line mode to cause error in determination of a line mode by the AND circuit 180. For example, although the personal computer signal in Table 1 is selected by the input selecting circuit 4, there is a fear that determination might be erroneously made as if the personal computer signal in Table 1 were selected and the horizontal oscillator 13 and the horizontal deflecting circuit 14 might be switched by the switching circuit 18 to correspond to the line mode erroneously determined by that television signal.

Therefore, the erroneous operation prevention circuit 19 comprises a noise level detecting circuit 191 and an erroneous operation prevention signal providing circuit 194 as shown in FIG. 5. The noise level detecting circuit 191 comprises a noise amplifier 192 and a detector 193. The noise amplifier 192 receives from the second video amplifier 7, a video signal containing a noise as shown in FIG. 6(a) and amplifies mainly the synchronizing signal by a bias approximate to the class B amplification.

The detector 193 comprises, as shown in FIG. 7 for example, a diode detector and the like connected to the output of the noise amplifier 192 through a capacitor C for stop of direct current. The detector 193 receives the output of the noise amplifier 192 as shown in FIG. 6(b) and provides detected voltage as shown in FIG. 6(d). More specifically, in such construction as described above, the output voltage of the detector 193 rises in synchronism with the rise of the horizontal synchronizing signal and the receipt of the noise and when this output voltage exceeds the voltage corresponding to the noise level which makes the apparent number of pulses of the horizontal synchronizing signal twice as large as the real number thereof for example, the erroneous operation prevention signal providing circuit 194 is conducted to provide an erroneous operation prevention signal as shown in FIG. 6(e).

Thus, the erroneous operation prevention circuit 19 makes it possible to completely prevent the erroneous operation, that is, the supply of an erroneous mode signal due to the wrong determination of a line mode caused by counting the apparent number of pulses of the horizontal synchronizing signal larger than the real number thereof in the case where a noise signal contained in a video signal is applied to the counter 179 of the line mode detecting circuit 17.

Figure 8:
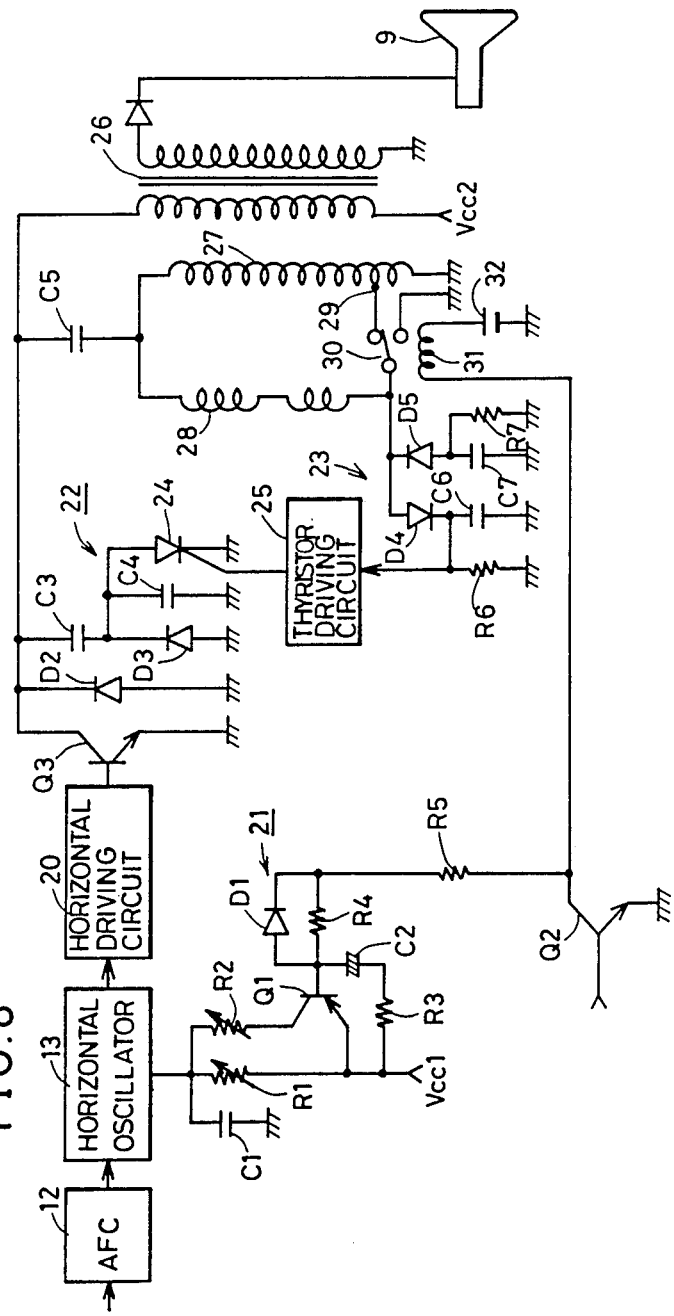
FIG. 8 is an electric circuit diagram showing a horizontal oscillating circuit and a horizontal deflecting circuit.

FIG. 8 is an electric circuit diagram showing the horizontal oscillator and the horizontal deflecting circuit. Referring to FIG. 8, a horizontal oscillating frequency selecting circuit 21 for selecting a horizontal oscillating frequency according to each mode is provided in association with the horizontal oscillator 13. The horizontal oscillator 13 is provided with resistors R1 and R2 and a capacitor C1 externally so that an oscillating frequency can be determined by the time constants thereof. More specifically, in the standard mode, the resistor R1 and the capacitor C1 are connected to make oscillation with the horizontal deflecting frequency $f_1$ and the time constant is $1/R1·C1$. In the high-resolution mode, the transistor $Q_1$ is conductive and the resistor R1, R2 and the capacitor C1 are connected externally to make oscillation with the horizontal deflecting frequency $f_2$, the time constant being $1/((R1//R2)·C1)$.

The transistor $Q_1$ is controlled so that it changes rapidly from the interrupted state to the conducted state, that is, from the state of oscillation with the horizontal deflecting frequency $f_1$ to the state of oscillation with the horizontal deflecting frequency $f_2$ and changes slowly from the conducted state to the interrupted state. More specifically, in order to change the time constant at the time of conduction and interruption of the transistor Q1, the resistors R3, R4, R5, a capacitor C2 and a diode D1 are connected. The transistor Q1 is conducted when the transistor Q2 controlled by the switching control signal from the switching circuit 18 shown in FIG. 1 is conducted.

The oscillation output of the horizontal oscillator 13 is applied to a horizontal drive circuit 20. To the output of the horizontal drive circuit 20, a horizontal deflecting transistor Q3 is connected. To the collector of the horizontal deflecting transistor Q3, a horizontal flyback period selecting circuit 22 is connected. More specifically, between the collector and the emitter of the horizontal deflecting transistor Q3, a flywheel diode D2 is connected and capacitors C3 and C4 are connected in series. To the point of connection of the capacitors C3 and C4, a cathode of a bias diode D3 and an anode of a thyristor 24 are connected. To the emitter of the horizontal deflecting output transistor Q3, an anode of the diode D3 and a cathode of the thyristor 24 are connected. The gate of the thyristor 24 is connected to a thyristor drive circuit 25.

In response to a gate signal from the thyristor drive circuit 25, the thyristor 24 is conducted in the standard mode to bring the capacitor C4 into a short-circuited state. As a result, the capacitance for determining a horizontal flyback period is determined only by the capacitor C3. On the other hand, the thyristor 24 is in the non conductive state in the high-resolution mode and the horizontal flyback period is made shorter than that in the standard mode as the capacitance for determining the horizontal flyback period is set to C3·C4/(C3+C4).

To the collector of the above stated horizontal deflecting output transistor Q3, a flyback transformer 26 is connected and an end of a deflecting coil 28 and an end of a step-down transformer 27 are also connected through the S-letter correction capacitor C5. The other end of the step-down transformer 27 is grounded and an intermediate tap 29 thereof is connected to one contact of a relay 30. The other contact of the relay 30 is grounded and a common contact is connected to the other end of the deflecting coil 28. The relay 30 selects a horizontal amplitude in the standard mode and that in the high-resolution mode.

An end of a coil 31 of the relay 30 is connected to a DC power source 32 and the other end thereof is connected to the collector of the above stated transistor Q2. Further, a protection circuit 23 is connected to the common contact of the relay 30. The protection circuit 23 comprises diodes D, D5, resistors R6, R7 and capacitors C6 and C7. The protection circuit 23 is temporarily opened at the time of switching the contact of the relay 30 and an abnormal pulse of high voltage generated at this time in the horizontal deflecting coil 28 is absorbed by the protection circuit 23. The diode D4 and the capacitor C6 included in the protection circuit 23 constitute a rectifier, which rectifies pulse voltage generated at the time of switching the contact of the relay 30 from the ground side to the side of the intermediate tap 29 of the step-down transformer 27, so as to apply DC voltage to the thyristor drive circuit 25.

Now, referring to FIG. 8, operation for selecting a horizontal oscillating frequency, a horizontal flyback period and a horizontal amplitude at the time of change from the standard mode to the high-resolution mode will be described in detail. First, the collector current $I_{CP}$ of the horizontal output transistor Q3 and the flyback pulse voltage $V_{CP}$ which are transitionally generated at the time of switching between the standard mode and the high-resolution mode are represented by the following first and second equations:

$$I_{CP} = V_{CC} \cdot T/L \quad (1)$$
$$V_{CP} = V_{CC}\{\pi/2(T_H/T_R - 1) + 1\}$$

$$T_R = \pi\sqrt{LC} \quad (2)$$

where $V_{CC}$ is power source voltage, T is a conduction period of the horizontal output transistor Q3, L is a synthesized inductance, $T_H$ is a horizontal cycle, $T_R$ is a flyback period and C is a synthesized capacitance of the capacitors C3 and C4.

From these first and second equations, it can be understood that the flyback pulse voltage $V_{CP}$ and the collector current $I_{CP}$ of the horizontal output transistor Q3 become large as the horizontal cycle $T_H$ becomes long. It can also be understood that the flyback period $T_R$ becomes short and the flyback pulse voltage $V_{CP}$ becomes large according to the decrease of the synthesized capacitance C. Therefore, in this invention, change of modes is made in the below indicated order of selection for the purpose of making as small as possible a transitionally generated energy due to the change of modes.

(1) Change from the Standard Mode to the High-Resolution Mode
  Horizontal Oscillating Frequency→Horizontal Amplitude→Resonance Capacitance
(2) Change from the High-Resolution Mode to the Standard Mode
  Horizontal Amplitude→Resonance Capacity→Horizontal Oscillating Frequency According to the above indicated order of selection, the surge voltage and the stress applied to the horizontal output transistor Q3 are decreased. Accordingly, in an embodiment of the present invention, this order of selection can be established by arranging the horizontal oscillator and the horizontal output circuit as shown in FIG. 8.

More specifically, in the standard mode, the horizontal oscillator 13 oscillates with the frequency $f_1$ determined by the time constants of the external resistor R1 and capacitor C1. When change is made from the standard mode to the high-resolution mode, the transistor Q2 is conducted and as a result, the transistor Q1 is conducted, whereby the resistor R2 is connected in parallel with the resistor R1. In consequence, the horizontal oscillator 13 oscillates with the frequency $f_2$ corresponding to the high-resolution mode.

On the other hand, the contact of the relay 30 is turned to the side of the intermediate tap 29 of the step-down transformer 27. As a result, in the standard mode, the deflecting coil 28 is set to the horizontal amplitude stepped down by the step-down transformer 27. Since the contact of the relay 30 is turned to the side of the intermediate tap 29 of the step-down transformer 27, a pulse is provided at the common contact. This pulse is rectified and stabilized by the diode D4 and the capacitor C6 so that a predetermined gate voltage is generated by the thyristor drive circuit 25. The thyristor 4 is conducted by this gate voltage to bring the capacitor C4 into a short-circuited state. As a result, only the resonance capacitance of the capacitor C3 is connected between the collector and the emitter of the horizontal output transistor Q3. Accordingly, the horizontal flyback period corresponding to the standard mode is selected.

Then, when the high-resolution mode is determined, the transistor Q2 is conducted. As a result, the transistor Q1 is also conducted and the horizontal oscillator 13 is connected in parallel with the externally provided resistors R1 and R2. The horizontal oscillator 13 oscillates with the frequency $f_2$ corresponding to the high-resolution mode, with the time constants determined by the resistors R1 and R2 and the capacitor C1.

On the other hand, conduction of the transistor Q2 causes electric current to flow in the coil 31 of the relay 30 so that the contact of the relay 30 is turned from the side of the intermediate tap 29 to the ground side. As a result, the deflecting coil 28 is not stepped down by the step-down transformer 27 so that the horizontal amplitude corresponds to the high-resolution mode. Further, since pulse is not provided at the common contact as a result of switching of the contact of the relay 30, the thyristor 24 is brought into the non conductive state. Then, the resonance capacitance of the capacitors C3 and C4 are caused to be connected between the collector and the emitter of the horizontal output transistor Q3, whereby the horizontal flyback period corresponding to the high resolution mode is selected.

When the line mode detecting circuit 17 detects the change from the high-resolution mode to the standard mode, the transistor Q2 becomes non conductive. However, since the time constant circuit is provided to make the transistor Q1 changed slowly from the conductive state to the interrupted state, the transistor Q1 is not immediately brought into the non conductive state although the transistor Q2 becomes non conductive. As the result of the non conductive state of the transistor Q2, electric current stops flowing in the coil 31 side of the intermediate tap 29 of the step-down transformer 27. Consequently, the horizontal amplitude corresponding to the standard mode is selected.

The contact of the relay 30 turned to the side of the intermediate tap 29 causes a pulse at the common contact. The pulse is rectified and stabilized by the diode D4 and the capacitor C6 and the thyristor 24 is conducted by the gate voltage according to the DC voltage. As a result, the capacitor C4 is short-circuited and the resonance capacitance is formed only by the capacitor C3, whereby the horizontal flyback period corresponding to the standard mode is selected. After completion of this sequential operation, the transistor Q1 for selecting the oscillating frequency of the horizontal oscillator 13 is interrupted and the external resistor R2 is separated, so that the horizontal oscillator 13 oscillates with the frequency $f_1$ corresponding to the standard mode, with the time constants determined by the external resistor R1 and capacitor C1.

Thus, change from the standard mode to the high-resolution mode is made according to the order of selection of the horizontal oscillating frequency, the horizontal amplitude and the resonance capacitance, and change from the high-resolution mode to the standard mode is made according to the order of selection of the horizontal amplitude, the resonance capacitance and the horizontal oscillating frequency. As a result, the surge voltage and the stress applied to the circuit elements such as the horizontal output transistor Q3 can be decreased and the respective modes can be selected stably without turning off the power source switch.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A CRT display unit capable of selecting a standard mode and a high-resolution mode, comprising:
    synchronizing signal separating means for separating a horizontal synchronizing signal and a vertical synchronizing signal from a composite video signal,
    counting means for counting said horizontal synchronizing signal, said counting means being reset by said vertical synchronizing signal,
    determining means for determining said standard mode or said high-resolution mode upon receipt of the count output of said counting means, and
    horizontal output means for selecting and providing, a horizontal oscillating frequency, a horizontal amplitude and a horizontal flyback period according to the respective modes based on the determination output of said determining means.

2. A CRT display unit in accordance with claim 1, wherein
    said horizontal output means comprises selecting means which first selects, said horizontal oscillating frequency, corresponding to the high-resolution mode in response to the determination by said mode determining means of the change from the standard mode to the high-resolution mode and last selects, said horizontal oscillating frequency in response to the determination by said mode determining means of the change from the high resolution mode to the standard mode.

3. A CRT display unit in accordance with claim 2, wherein
    said horizontal output means comprises:
        horizontal oscillating means for providing a horizontal oscillation signal and
        means for changing the oscillating frequency of said horizontal oscillating means in response to the determination of the change to the high-resolution mode by said determining means.

4. A CRT display unit in accordance with claim 3, wherein
    said horizontal oscillating means comprises a time constant circuit, and
    said means for changing the oscillating frequency comprises switching means conducted in response to the determination of the change to the high-resolution mode by said determining means, whereby the time constants of said time constant circuit are selected.

5. A CRT display unit in accordance with claim 3, wherein
    said horizontal output means comprises:
        horizontal drive means for receiving the oscillation output of said horizontal oscillating means,
        a horizontal deflecting transistor driven by said horizontal drive means,
        a time constant circuit connected to the output side of said horizontal deflecting transistor so as to determine said horizontal flyback period, and
        means for selecting the constants of said time constant circuit in response to the determination of the change to the high-resolution mode by said determining means.

6. A CRT display unit in accordance with claim 5, wherein
    said time constant circuit comprises a first capacitor and a second capacitor connected in series between a collector and an emitter of said horizontal deflecting transistor, and
    said selecting means comprises:
        a diode having a cathode connected to a point of connection of said first and second capacitors and an anode connected to the emitter of said horizontal deflecting transistor, a thyristor having an anode connected to the point of connection of said first and second capacitors and a cathode connected to the emitter of said horizontal deflecting transistor, and a circuit for applying a gate signal to a gate of said thyristor in response to the determination of the change to the high-resolution mode by said determining means 7. A CRT display unit in accordance with claim 5, wherein said horizontal output means comprises:

a capacitor for S-letter correction connected to the collector of said horizontal deflecting transistor, a horizontal deflecting coil having an end connected to the other end of said S-letter correction capacitor, a step-down transformer (27) including an intermediate tap, an end of said step-down transformer being connected to the other end of said S-letter correction capacitor, and selecting means for selecting the horizontal amplitude by connecting the other end of said horizontal deflecting coil to the intermediate tap of said step-down transformer in response to the determination of the change to the high-resolution mode by said determining means.

8. A CRT display unit in accordance with claim 7, wherein said selecting means comprises a relay having a contact connected between the other end of said horizontal deflecting coil and said step-down transformer, said contact being closed dependent on the determination output of said determining means, and further comprises a protection circuit connected to the other end of said horizontal deflecting coil so as to absorb an abnormal pulse generated at the time of opening and closing the contact of said relay.

9. A CRT display unit in accordance with claim 1, further comprising:

a noise level detecting circuit for detecting a noise level included in the video signal, and forbidding means for forbidding the selection of said horizontal deflecting means according to the respective modes, when the noise level detected by said noise level detecting circuit exceeds a predetermined value.

* * * * *